United States Patent [19]

Enbusk

[11] 4,442,659
[45] Apr. 17, 1984

[54] DOLLY FOR LAWN TRIMMER AND COMBINATION THEREOF

[76] Inventor: Henry J. Enbusk, Rt. 1, Box 1151, Clatskanie, Oreg. 97016

[21] Appl. No.: 411,667

[22] Filed: Aug. 26, 1982

[51] Int. Cl.³ .............................................. A01G 3/06
[52] U.S. Cl. ...................................... 56/12.7; 56/256; 280/47.24
[58] Field of Search ....................... 56/12.7, 16.9, 17.5, 56/256; 280/47.17, 47.24

[56] References Cited

U.S. PATENT DOCUMENTS

| | | | |
|---|---|---|---|
| 2,730,320 | 1/1956 | Srader | 280/47.24 |
| 4,182,100 | 1/1980 | Letter | 56/12.7 |
| 4,389,836 | 6/1983 | Lowry | 56/17.5 |

Primary Examiner—Jay N. Eskovitz
Attorney, Agent, or Firm—Robert L. Harrington

[57] ABSTRACT

A trimmer supported on a dolly, each of which has a handle. The operator holds the dolly handle in one hand and the trimmer handle in the other hand. The trimmer is pivotally connected to the dolly whereby movement of the handle of the trimmer relative to the dolly handle changes the approach angle of the trimmer relative to the movement of the dolly. The pivotal connection is forward of the dolly wheels whereby raising and lowering the dolly handle effects lowering and raising of the trimmer and the corresponding depth of cut. The connection includes adjustment means to adjust the positions of the trimmer relative to the dolly.

11 Claims, 6 Drawing Figures

DOLLY FOR LAWN TRIMMER AND COMBINATION THEREOF

BACKGROUND OF THE INVENTION

This invention relates to lawn trimmers of the type that are normally hand held and more particularly to a support dolly for such lawn trimmers to enable the operator to convert such lawn trimmers to being supported and wheeled along the ground, thereby reducing operator fatigue and increasing trimmer control.

Lawn trimmers and particularly powered lawn trimmers have become increasingly popular in recent years for lawn maintenance. The early powered lawn edgers used rigid blades mounted on a heavy wheel supported chassis which was pushed along a sidewalk. These edgers are effective in trimming the lawn back from a straight reach of sidewalk but they have little versatility and are not generally considered appropriate for trimming around contoured flowerbeds and the like. An alternative to the wheel mounted edger was subsequently developed which is referred to as a hand held trimmer. This device has a handle and power source which drives a rotatable blade or trimming string located in a trimmer head suspended from a shaft connected to the handle. The user simply carries the device and maneuvers the trimming head as desired to achieve trimming of grass and the like in areas generally considered unreachable with a lawn mower or lawn edger. It is capable of edging along sidewalks and trimming around flowerbeds and the like. However, in the hand held mode, the trimmer is difficult to accurately control so as to achieve the desired neat edges.

SUMMARY OF INVENTION

The device of the present invention is believed to provide advantages over these prior devices. In general, the preferred device of the present invention provides a carrier dolly for the hand held type of trimmer. The dolly is preferably two wheeled with a support member extending forwardly and a handle extending rearwardly of the wheels. A bracket is provided on the trimmer handle near the trimmer head which is adapted to be attached to the support of the dolly. The bracket and the manner of attaching it to the dolly permits pivoting of the trimmer relative to the dolly which is effected by the operator's movement of the trimmer handle relative to the dolly handle. In this manner, the maneuverability advantages of the hand held trimmer are largely preserved while increasing control and reducing fatigue.

Having thus briefly described the preferred embodiment of the invention, a more detailed description is hereafter set forth including drawings wherein.

DESCRIPTION OF THE PREFERRED EMBODIMENTS

Figure 1:
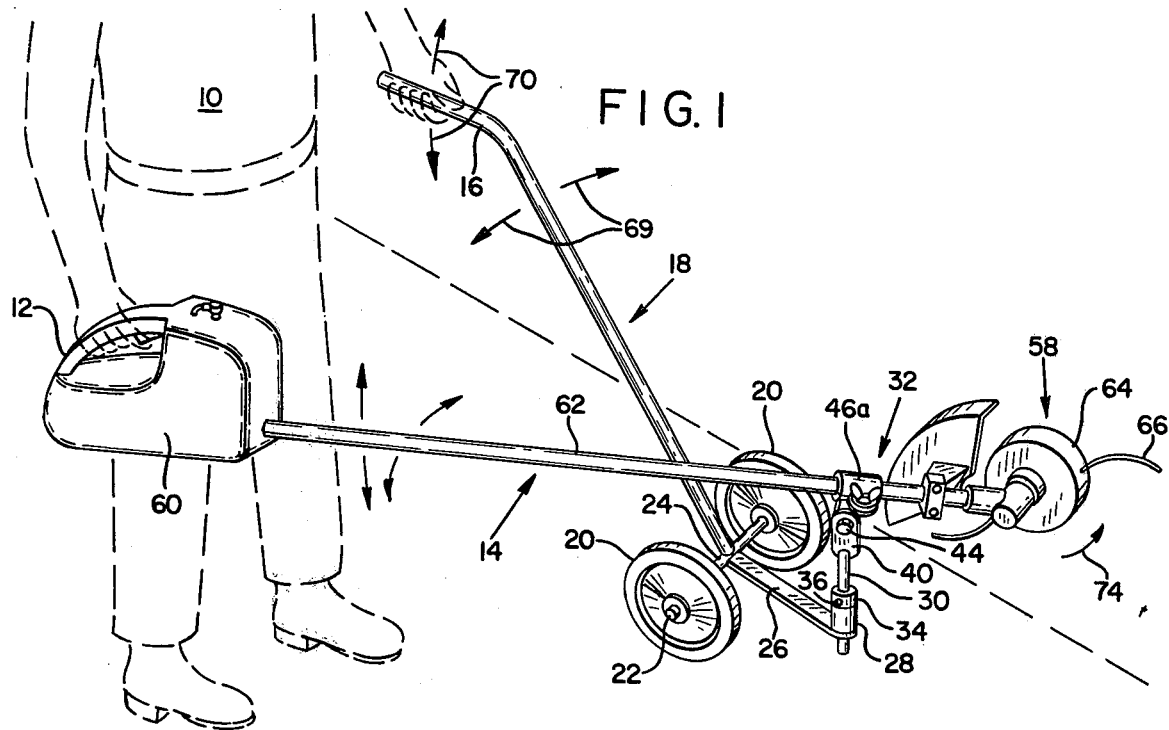
FIG. 1 is a perspective view of the preferred embodiment of the invention illustrating the invention in operation.
Figure 2:
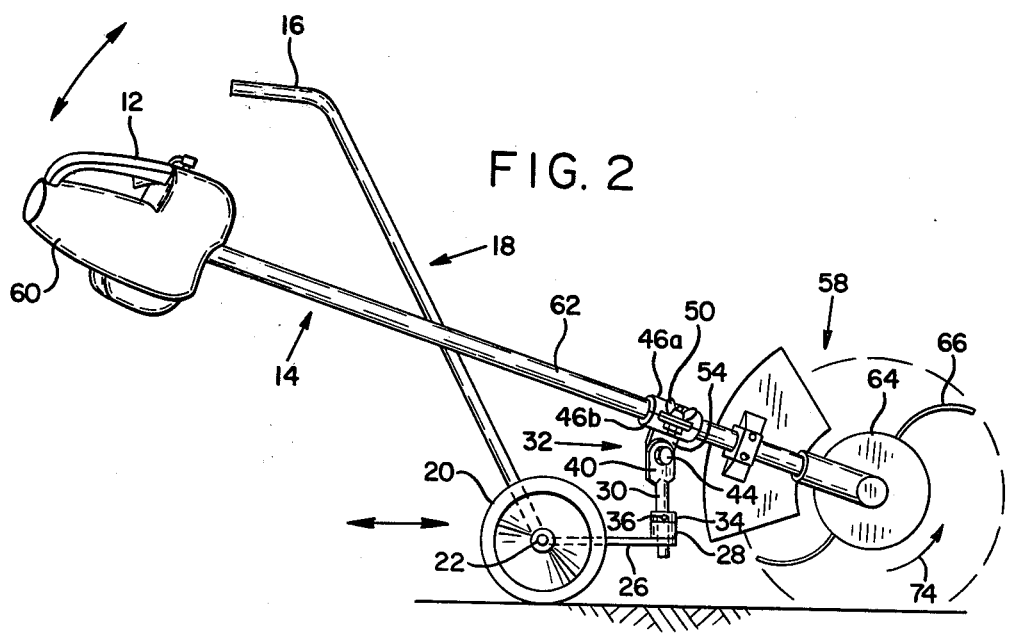
FIG. 2 is a side view of the dolly and trimmer of FIG. 1.

Referring to the drawings of FIGS. 1 through 4, an operator 10, shown in dotted lines in FIG. 1, grips handle 12 of a lawn trimmer 14 with his right hand and handle 16 of a dolly 18 with his left hand. The dolly 18 includes a pair of wheels 20 spaced apart in parallel relationship by an axle 22 and axle retainer 24. The wheels 20 are fixed to the axle e.g., by cotter keys (not shown). The dolly frame includes a support 26 that is fixed to the axle retainer 24 e.g., by welding, and projects forwardly of the wheels 20, with the handle 16 fixed to the axle retainer so as to project upwardly and rearwardly of the wheels 20.

Figure 4:
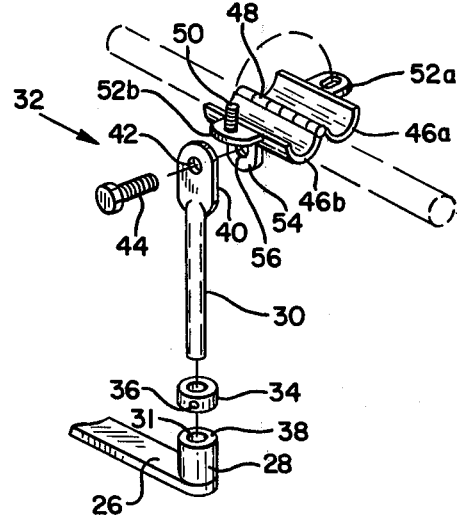
FIG. 4 is an exploded view of the mounting bracket of FIGS. 1 through 3.

With particular reference to FIG. 4, fixed to the support 26 at a position spaced forwardly of the axle retainer 24 is a pedestal receiver 28 having a bearing opening 31 that extends through the pedestal receiver 28 and support 26. The bearing opening 31 is adapted to receive a pedestal 30 of a mounting bracket 32. A set collar 34 is positioned on the pedestal 30 at the desired position and locked in place by set screw 36. Whereas the pedestal has free rotative movement within the bearing opening 31, it is limited in axial movement by the collar 34 resting on the shoulder 38 of the pedestal receiver 28.

The upper end of the pedestal 30 forms a flange 40 having an opening 42 adapted to receive a fastening bolt 44. A clamp 46 comprises upper and lower saddle portions 46a and 46b respectively and a hinged connection 48. The saddle portions are adapted to be clamped together by a fastening screw 50 passing through ear portions 52a and 52b of the respective saddle portions 46a and 46b. A flange portion 54 with bolt receiving opening 56 depends from the lower saddle portion 46a. The flange portions 40 and 54 are mated so as to align bolt receiving openings 42 and 56, with fastening bolt 44 clamping the two flange portions together at the desired angular relationship.

The lawn trimmer 14 is typical of lawn trimmers available on the market and includes the standard components of a trimmer head 58, a motor housing 60 (including handle 12) and a connecting shaft 62. Also typically utilized on such trimmers is a secondary handle located part way down on the shaft 62. This secondary handle is gripped by an operators left hand when the lawn trimmer is carried. This secondary handle is not shown in the drawings to avoid unnecessary complication. It will be understood that a motor contained in the motor housing 60 drives a drive shaft contained in the trimmer head 58 e.g., by a cable running through the connecting shaft 62. A grass cutting implement 64 is rotatively driven by the drive shaft, and trimming blades or trimming string 66 carried by the implement 64 is accordingly rotatively driven at high speeds to effectively cut grass and the like in its path.

Figure 5:
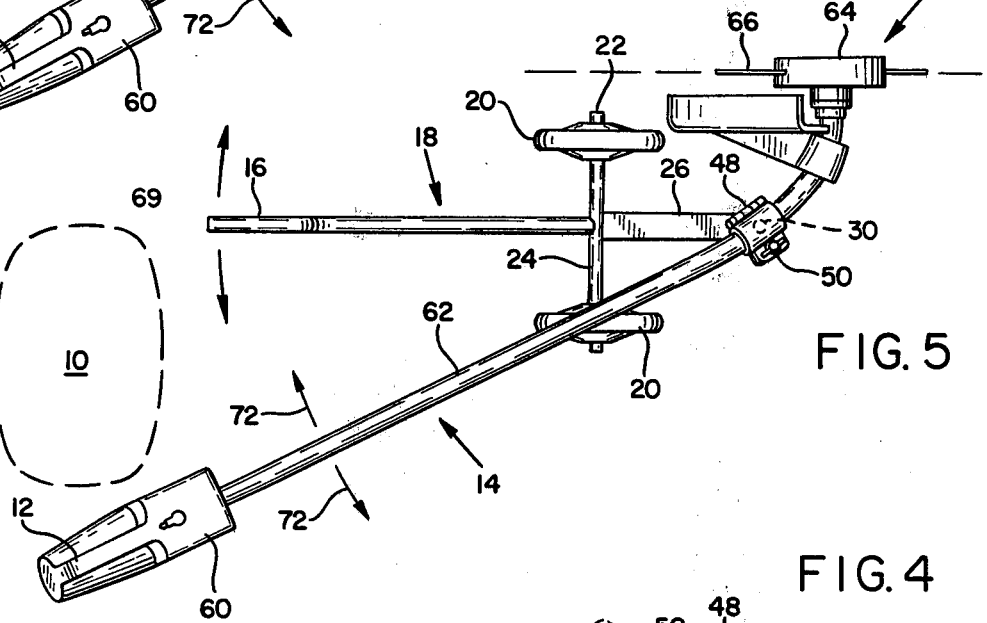
FIG. 5 is a view similar to FIG. 3 but showing an alternative embodiment of the invention.
Figure 6:
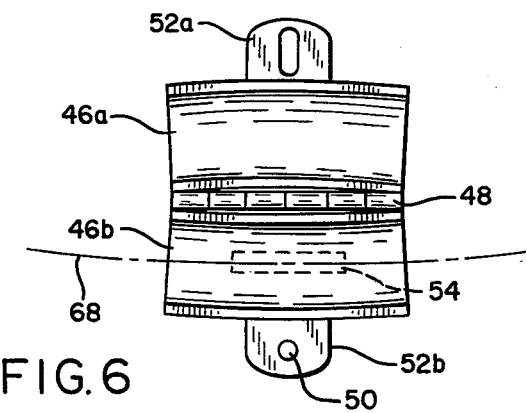
FIG. 6 is a view of the clamping portion of the mounting bracket of FIG. 5.

Refer now to FIGS. 5 and 6 which show an alternative embodiment of the invention. A common variation of the grass trimmer shown in FIGS. 1 through 4, which has a straight shaft 62, is the trimmer shown in FIGS. 5 and 6 which has a curved shaft 63, particularly in the area close to the trimmer head 64 where the clamp 47 is attached. Whereas the collar 34 can be easily adjusted to accommodate a desired height change for the clamp, it is desireable to provide curved upper and lower saddle portions 47a and 47b as illustrated in FIG. 6 and denoted by the curvature of centerline 68.

OPERATION OF THE DESCRIBED EMBODIMENTS

It will be appreciated that the trimmer dolly 18 is simple in its construction (and thus inexpensive to produce) while providing great flexibility in the application and use of the trimmer. Note for example that clamp 32 may be tightly secured to the shaft 62 to prevent turning of the shaft (after the cutting implement is set at the desired angle) and bolt 44 may be tightly secured to the flange portions 40 and 54 to prevent vertical pivoting of the trimmer relative to the dolly. The dolly is easily steered with the left hand around the contoured edges of flowerbeds and the like. It can also be pivoted as indicated by arrow 69 to reach into the flowerbed to remove weeds growing close to the edge. By raising and lowering the dolly handle as denoted by arrow 70 in FIG. 1, the trimmer is accordingly lowered and raised by reason of the mounting of the pedestal forwardly of the wheels. This controls the depth of cut. The horizontal approach angle of the rotating trimmer string 66 is adjusted by moving the right hand holding the handle of the trimmer in or out relative to the dolly handle. This movement is denoted by arrow 72 in FIGS. 3 and 5.

The operation of the trimmer and dolly combination above described, is believed to be the most desireable for trimming contoured flowerbeds, around bushes, and even along sidewalks. It will be understood, however, that the operator has the option of loosening clamp 32 and/or bolt 44 to permit rotative movement of shaft 62 and/or pivotal movement of the trimmer relative to the dolly during operation. To the other extreme, a set screw can be provided in the pedestal receiver 28 to lock the pedestal 30 to the pedestal receiver and, thus, prevent the in-and-out movement of the trimmer as denoted by arrow 72. It should be noted that the direction of rotation of the trimmer string 66 is preferable established as denoted by arrow 74 in FIGS. 1 and 2. This rotation of the string digs out grass and the like and throws it away from the operator as opposed to throwing it at the operator if the rotation were reversed.

Figure 3:
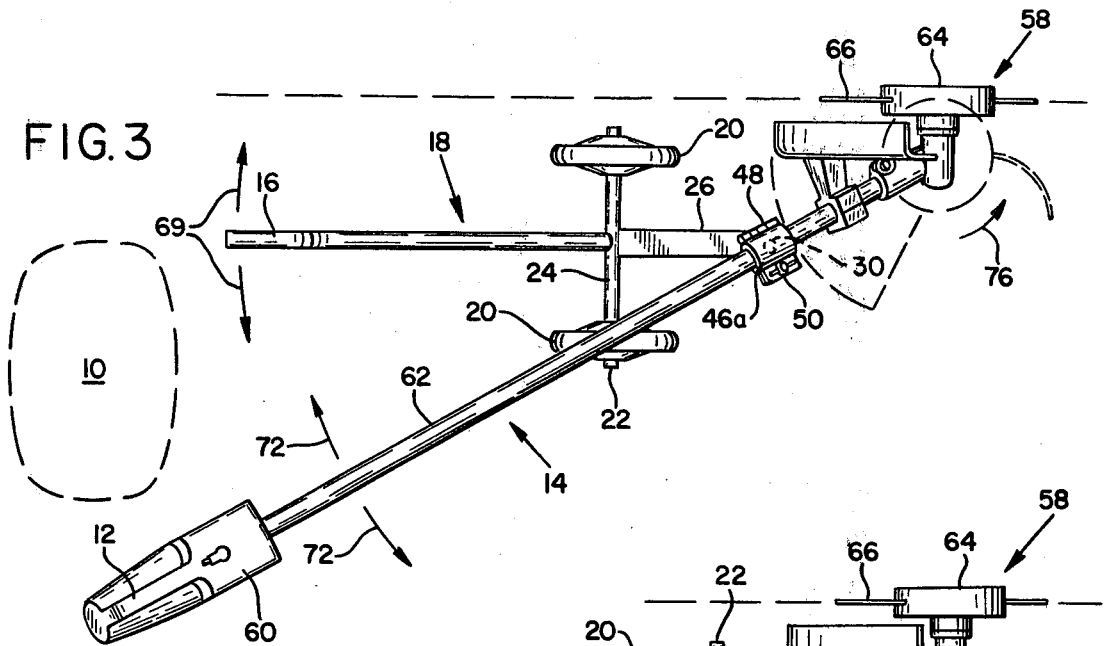
FIG. 3 is a top view of the trimmer and dolly of FIG. 1.

It will also be appreciated that the trimmer can be rotatively oriented relative to the dolly so as to cause the trimmer string to rotate in a horizontal plane (by adjustment of the shaft 62 in the clamp 32). See the dotted lines and indicator arrow 76 of FIG. 3 illustrating this variation. In this mode the trimmer can be used in a manner similar to a lawn mower. A further use of the described combination of devices has been found where the attachment is provided in the preferred form (i.e., with clamp 32 and bolt 44 tight and with the pedestal freely moveable in the pedestal receiver). Grass and weeds will often grow up in cracks in sidewalks and driveways. The dolly can be maneuvered next to this unwanted growth and the trimmer handle moved in-and-out to cut a relatively wide swathe over the crack and thereby remove the growth.

Whereas the bracket assembly described can be modified so that the pedestal 30 is secured to the pedestal receiver 28, it has been found that it is desireable to simply allow free pedestal movement. The pedestal can be withdrawn from the pedestal receiver simply by lifting the trimmer relative to the dolly. The trimmer can then be used in its conventional form (to perhaps trim inside spaces too tight for the dolly) and of course easily reassembled to the dolly when desired. Other advantages and alternative uses and embodiments will be apparent to those skilled in the art after appreciating the basic concept disclosed herein. An example might be the provision of a single wheeled dolly to provide side to side tipping of the dolly and adjustment thereby of the vertical cutting angle of the trimmer string. Of course such tipping can be accomplished with the two wheeled dolly but not as readily as with a single wheel. Thus, it is to be understood that this invention is not restricted to the specific embodiments or uses described herein but that the invention encompasses the full breath of coverage provided by the claims appended hereto.

I claim:

1. A support dolly for a trimmer for trimming and edging operations that includes a trimmer head adapted to be maneuvered in suspended relation to the ground, a handle adapted to be gripped by an operator while in a standing position, and a shaft connecting the handle and the trimmer head; said support dolly comprising: at least one wheel, a dolly frame, mounting means to mount the dolly frame to the wheel, and a bracket assembly carried by the dolly frame and adapted to mount the trimmer to the dolly frame; said dolly frame including a support member extending forward of the wheel and a handle member including a handle extending rearward and upward of the wheel being supported on the ground; and said bracket assembly including a bracket adapted for connection to the shaft of the trimmer, and a pivotal coupling means coupling the bracket to the support member forwardly of the wheel, said coupling means providing free horizontal pivoting of the bracket and free pivotal swinging of the trimmer carried thereby during trimming and edging operations whereby the operator can simultaneously control the handles of both the dolly and trimmer.

2. A support dolly as defined in claim 1 wherein a pair of wheels is provided and the mounting means includes; an axle maintaining the wheels in parallel relationship, and an axle retainer mounted on said axle, said support member and said handle member being carried by the axle retainer, and said pivotal coupling means comprising a pedestal retainer fixed to the support member, and a pedestal depended from the bracket adapted for free insertion and rotative movement within the pedestal retainer.

3. A support dolly as defined in claim 2 wherein the bracket includes upper and lower saddle portions for cooperatively encircling the shaft of the trimmer, a hinge connecting the saddle portions along one edge and ear portions provided on the opposite edges, and releasable fastening means interconnecting the ear portions to fix the bracket to the shaft of the trimmer.

4. A support dolly as defined in claim 2 wherein the pivotal coupling means further includes adjustable fastening means for fastening the pedestal to the bracket whereby the angle of dependency can be selectively varied to change the vertical position of the trimmer relative to the dolly.

5. A support dolly as defined in claim 4 wherein the adjustable fastening means includes means to selectively lock the relative position of the bracket and the pedestal and to alternatively provide free pivotal movement thereof.

6. A support dolly as defined in claim 5 wherein a moveable and lockable collar is provided on the pedestal, the said collar engaging the pedestal receiver to limit the insertion of the pedestal within the pedestal receiver and thereby control the height of the bracket over the support member.

7. A support dolly and lawn trimmer combination comprising: a trimmer for trimming and edging operations including a trimmer head housing a grass cutting implement, a handle, a shaft connecting the handle to the trimmer head, and power means to drive the grass cutting implement; and a support dolly including at least one wheel, a dolly frame, mounting means mounting the dolly frame to the wheel, and a bracket assembly carried by the dolly frame, said dolly frame including a support member extending forwardly of the wheel and a handle member including a handle extending rearwardly and upwardly of the wheel while supported on the ground, and said bracket assembly including a bracket that is removably connected to the trimmer, and pivotal coupling means coupling the bracket to the support member forwardly of the wheel, said coupling means providing free horizontal pivoting of the bracket and free pivotal swinging of the trimmer carried thereby during trimming and edging operations whereby the operator can simultaneously control the handles of both the dolly and trimmer.

8. A support dolly and lawn trimmer combination as defined in claim 7 wherein the cutting implement contained in the trimmer head is a string trimmer.

9. A support dolly and lawn trimmer combination as defined in claim 7 wherein a pair of wheels is provided and the mounting means includes an axle maintaining wheels in parallel relationship, and an axle retainer mounted on said axle, said support member and said handle member being carried by the axle retainer, and said pivotal coupling means comprising a pedestal retainer fixed to the support member and a pedestal depended from the bracket adapted for insertion and rotative movement within the pedestal retainer.

10. A support dolly and lawn trimmer combination as defined in claim 9 wherein the pivotal coupling means further includes adjustable fastening means for fastening the pedestal to the bracket whereby the angle of dependency can be selectively varied to change the vertical position of the trimmer relative to the dolly.

11. A suuport dolly and lawn trimmer combination as defined in claim 10 wherein the adjustable fastening means includes means to selectively lock the rotative position of the bracket and the pedestal and to alternatively provide free pivotal movement thereof.

* * * * *